Patented Apr. 18, 1933

1,904,528

UNITED STATES PATENT OFFICE

WILHELM PUNGS AND KARL EISENMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

LACQUERS, FILMS, ARTIFICIAL MASSES, AND THE LIKE

No Drawing. Application filed April 19, 1928, Serial No. 271,401, and in Germany May 21, 1927.

This invention relates to improvements in the manufacture of lacquers, films, artificial masses and the like, which are hereinafter referred to for the sake of brevity as "plastic masses and solutions thereof".

The production of lacquers by mixing cellulose ester and especially nitrocellulose lacquers with a solution of the resinous condensation products obtained by condensing urea and formaldehyde, is already known. Unless, however, the urea formaldehyde condensation products be mixed with at least a double quantity of cellulose ester, the coatings furnished by the resulting solutions have various drawbacks, such as a certain brittleness, poor adhesion to the substratum, and imperfect resistance to water.

We have now found that these drawbacks are removed, if the urea-formaldehyde condensation products, obtainable for example, by condensation of dimethylol urea in organic solvents, be brought into association, in the presence of solvents, with considerable quantities of nitrocellulose, and also with vegetable oils, in particular castor oil, which have previously been treated with oxidizing gases at an elevated temperature, for example from 170 to 180° centigrade. The coatings furnished by lacquers prepared in this manner fulfill all requirements in respect of elasticity, adhesion and fastness to light and water, even when they contain equal amounts of urea formaldehyde condensation products and nitrocellulose, or even still smaller proportions of the latter. The amount of the pretreated vegetable oil to be added depends on the desired hardness and elasticity of the lacquer coating. The nitrocellulose may also be partially replaced by high grade natural resins, such as copals, or by artificial resins.

It is possible, according to this invention, to increase the relative proportion of urea formaldehyde condensation products in the lacquer without the said drawbacks resulting. The gloss of the coatings or films prepared with the lacquers is thereby increased and, in contrast to the usual nitrocellulose resin lacquers, they possess a considerable power of withstanding liquid hydrocarbons, such as benzine or benzene.

The lacquers may be applied by spraying, dipping or brushing, and they may also be mixed with coloring agents and/or fillers and/or plasticizing agents such as phthalic esters or triaryl phosphates. Owing to their resistance to hydrocarbons, they are particularly suitable as lacquers for motor cars. The lacquer solutions may also be treated, in any suitable apparatus and in any known and suitable manner, for the preparation of artificial masses of celluloid character, concentrated solutions being preferably employed for this purpose. Particularly suitable solvents for these lacquers comprise mixtures of lower aliphatic alcohols, especially n-butyl and isobutyl alcohol, and their acetic esters. Hydrocarbons may also be added as diluents.

The following examples will further illustrate the nature of the said invention, which however is not limited thereto. The parts are by weight.

Example 1

75 parts of a 33 per cent solution in isobutyl alcohol of a urea formaldehyde condensation product, prepared for example, by condensation of dimethylol urea in the isobutyl alcohol, are mixed with a solution of 25 parts of nitro-cellulose and 20 parts of castor oil, which has been previously treated with air at from 170 to 180° centigrade, in 125 parts of isobutyl acetate and 125 parts of n-butyl alcohol. Thorough stirring produces a clear, viscous lacquer. For application to a substratum by spraying, the lacquer may be diluted with a solvent or mixtures of solvents, consisting for example of 75 parts of ethyl alcohol, 100 parts of ethyl acetate, 100 parts of isobutyl acetate, 125 parts of isobutyl alcohol and 100 parts of benzene. When sprayed on glass, metal, wood and the like, the lacquer furnishes clear, elastic coatings with a high gloss.

Example 2

450 parts of a urea formaldehyde condensation product, contained in 900 parts of n-butyl alcohol are dissolved in a lacquer consisting of 300 parts of nitrocellulose, 150 parts of melted kauri copal, 450 parts of castor oil which has been pretreated with oxidizing gases, and 4500 parts of a mixture of equal parts of n-butyl acetate and isobutyl alcohol. The finished lacquer is diluted with 1500 parts of the solvent mixture described in Example 1, and also furnishes smooth and highly adherent coatings with high gloss.

Example 3

50 parts of a 60 per cent solution in ethyl alcohol of a formaldehyde-urea condensation product, obtainable by condensation of dimethylolurea, are mixed with 30 parts of nitrocellulose and 40 parts of tricresyl phosphate and thoroughly kneaded at 60 to 70° centigrade to a homogeneous mass in a suitable kneading machine. A solution of 20 parts of castor oil which has been pretreated with air at 170° centigrade, in 30 parts of ethyl alcohol is thereupon added and the mixture kneaded, the temperature being maintained, until the mass again becomes homogeneous. The temperature is thereupon raised to about 100° centigrade and the alcohol driven off, while still kneading.

The mass is then rolled out to slabs or sheets between hot rollers, or it is molded in a hot press. Filling materials such as asbestos or talcum may be incorporated with the said masses in any stage of their manufacture whereby they attain a higher solidity.

What we claim is:

1. As new compositions artificial masses comprising nitro-cellulose, a condensation product of urea and formaldehyde, and castor oil which has been pretreated with an oxidizing gas at an elevated temperature.

2. As new compositions artificial masses comprising nitro-cellulose, a condensation product of urea and formaldehyde, and castor oil which has been pretreated with an oxidizing gas at an elevated temperature, together with an organic solvent.

3. As new compositions artificial masses comprising nitro-cellulose, a condensation product of urea and formaldehyde, a resin and castor oil which has been pretreated with an oxidizing gas at an elevated temperature.

4. As new compositions lacquers comprising nitro-cellulose, a condensation product of urea and formaldehyde, castor oil which has been treated with air at from 170 to 180° C., a resin, butyl acetate and butyl alcohol.

5. An artificial mass comprising nitrocellulose, a condensation product of urea and formaldehyde, castor oil which has been pretreated with an oxidizing gas at an elevated temperature and a tri-aryl phosphate.

6. A composition of matter comprising nitrocellulose, a condensation product of urea and formaldehyde in an amount at least equal to the amount of nitrocellulose present, castor oil which has been pretreated at an elevated temperature with an oxidizing gas and butyl alcohol.

In testimony whereof we have hereunto set our hands.

WILHELM PUNGS.
KARL EISENMANN.